May 13, 1969      M. F. SYMES      3,442,268
COMBINATION TRAILER AND HAND CART
Filed June 18, 1968
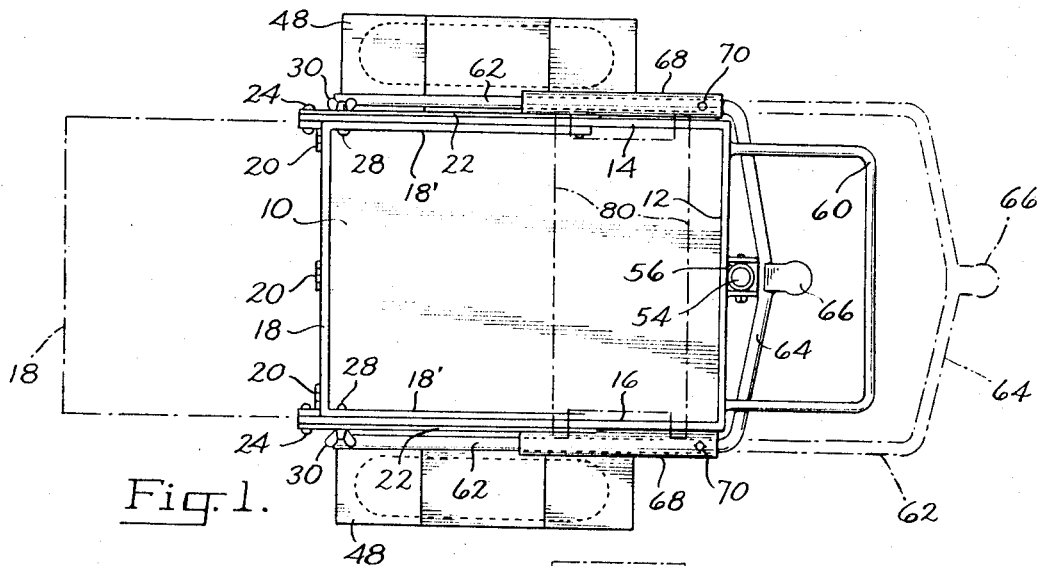
Fig. 1.
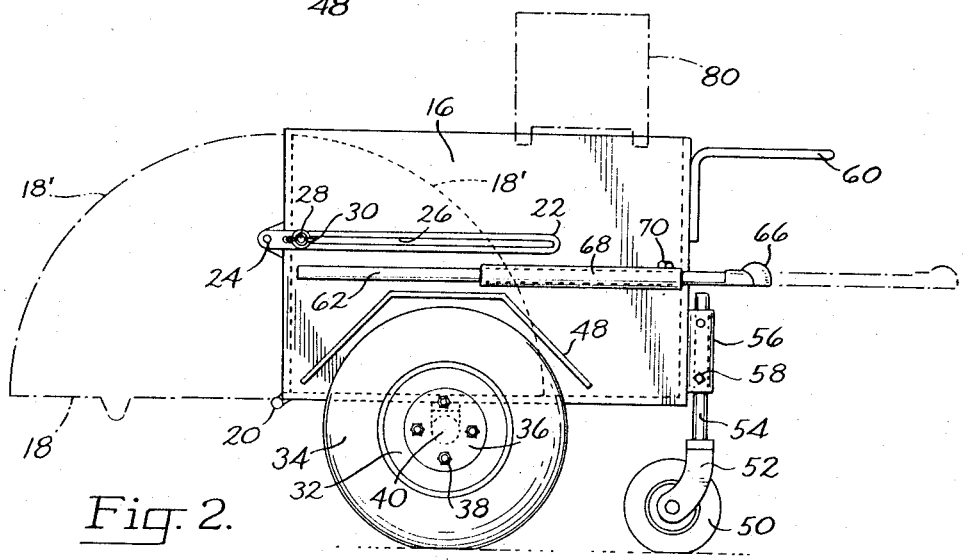
Fig. 2.
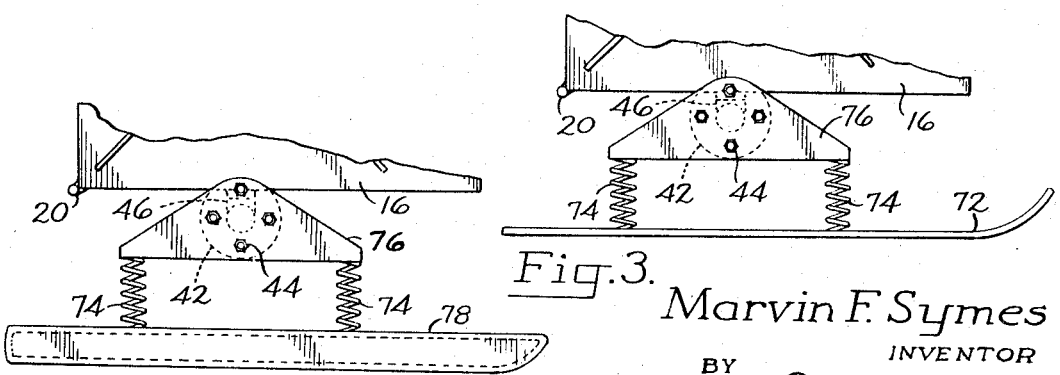
Fig. 4.      Fig. 3.
Marvin F. Symes
INVENTOR
BY
Agent 
United States Patent Office 3,443,268
Patented May 13, 1969

3,443,268
COMBINATION TRAILER AND HAND CART
Marvin F. Symes, Buel Apts., 5th and Madrona, Apt. 14,
Tillamook, Oreg. 97141
Filed June 18, 1968, Ser. No. 738,005
Int. Cl. B62b 5/06, 11/00, 19/04
U.S. Cl. 9—1                          10 Claims

ABSTRACT OF THE DISCLOSURE

A container supports at its forward end a longitudinally retractable trailer hitch, a fixed handle and a vertical retractable caster wheel, and is provided with a rear wall pivoted at its bottom edge. The container is supported for transport either on wheels, snow runners, or pontoons.

BACKGROUND OF THE INVENTION

This invention relates to trailers, and more particularly to a combination trailer and hand cart.

Trailers provided heretofore have not been convertible for effective hand manipulation in the manner of a hand cart, primarily because the centrally located trailer hitch reach projects into the area which an operator must occupy for manipulating the trailer by hand. Such trailers also have been used on land only, since they have not been convertible for use on snow and water.

SUMMARY OF THE INVENTION

In its basic concept the present invention provides a combination trailer and hand cart in which a trailer hitch reach is retractable for accommodating effective used of a fixed handle for hand manipulation, and in which a stabilizing caster wheel is mounted for retraction for trailing and for extension for hand manipulation in cooperation with a pair of ground-engaging wheels. Further, the ground-engaging wheels may be replaced by snow runners or by water pontoons.

It is by virtue of the foregoing basic concept that the principal objective of this invention is achieved, namely to overcome the disadvantages of prior trailers as enumerated hereinbefore.

Another important object of the present invention is the provision of a combination trailer and hand cart which is of simplified construction for economical manufacture and which may be employed for a diversity of uses.

The foregoing and other objects and advantages of this invention will appear from the following detailed description, taken in connection with the accompanying drawing of the preferred embodiments.

BRIEF DESCRIPTION OF THE DRAWING

FIG. 1 is a plan view of a combination trailer and hand cart embodying the features of the present invention, the trailer hitch reach and pivoted rear wall being shown extended in dash lines and retracted in solid lines.

FIG. 2 is a side elevation as viewed from the bottom in FIG. 1.

FIG. 3 is a fragmentary side elevation showing the container component mounted resiliently on snow runners.

FIG. 4 is a fragmentary side elevation showing the container component mounted resiliently on water pontoons.

DESCRIPTION OF THE PREFERRED EMBODIMENTS

The combination trailer and hand cart illustrated includes a container having a bottom 10, a front wall 12, laterally spaced side walls 14 and 16 and a rear wall 18. The rear wall may have arcuate side sections 18′, as illustrated, and is secured at its bottom edge to the bottom 10, as by hinges 20, for pivotal adjustment between open and closed positions.

Means is provided for securing the rear wall in either of these positions, or in any desired intermediate position. In the embodiment illustrated this means comprises a pair of elongated straps 22 secured pivotally at one end, by means of the pivot pins 24 one to each lateral side of the rear wall. Each strap is provided with an elongated slot 26 intermediate its ends which slidably receives therethrough a securing bolt 28 secured to and projecting laterally outward from the associated side wall of the container. A wing nut 30 on each bolt provides convenient hand manipulation for releasably clamping the strap between it and the adjacent side wall.

The rear wall thus may be secured in the closed position illustrated in solid lines, or in the extended position illustrated in dash lines, or any intermediate position.

Means is provided for supporting the container for movement over a supporting surface. In the embodiment illustrated in FIGS. 1 and 2, the supporting means comprises a pair of laterally spaced wheels 32 on which pneumatic tires 34 are mounted. The wheel is secured to a hub member 36, as by means of the bolts 38, and the hub member is mounted for rotation on a sub axle 40 secured to and projecting laterally outward from a mounting plate (not shown). The plate is secured to a fixed flange 42 (FIGS. 3 and 4) as by bolts 44 extending through aligned openings in the plate and flange. The flange is secured to the container bottom 10 by such means as the bracket 46.

Fenders 48, secured to the container side walls, project over the wheels, for the usual purpose.

A retractable caster wheel 50 also is provided at the front end of the container for use in stabilizing the latter during hand manipulation in the manner of a hand cart. The caster wheel is mounted on a swivel yoke 52 to which is secured an elongated mounting shaft 54. The shaft extends through a sleeve 56 secured to the front wall 12 of the container, centrally thereof, with the axis of its bore extending vertically. The mounting shaft thus is adjustable vertically relative to the sleeve, whereby to adjust the caster wheel between an upwardly retracted position, where it is out of the wall for trailering, and a downwardly extended position for stabilizing the container during hand manipulation. A removable locking pin 58 extends through registering openings in the shaft and sleeve, in predetermined positions of adjustment of the shaft, to secure the caster wheel in adjusted position.

Hand manipulation of the container is provided, in the embodiment illustrated, by means of the U-shaped handle member 60 secured to the front wall 12 of the container. The handle projects forwardly and transversely of the front wall, adjacent the upper side thereof. It will be understood that a pair of separate handles may be substituted for the one piece handle illustrated, if so desired.

A retractable trailer hitch reach is provided which, when extended, may be coupled to a towing vehicle and which, when retracted, accommodates convenient hand manipulation. The reach comprises a substantially U-shaped member which defines a pair of laterally spaced, rearwardly extending arm portions 62 and a forward, transverse connecting portion 64. The connecting portion mounts centrally thereof a trailer hitch coupling member, such as the socket component 66 of a conventional ball and socket trailer hitch.

The rearwardly extending arm portions 62 are received slidably in a pair of supporting sleeves 68 secured to the outer sides of the side walls 14 and 16 of the container. The trailer hitch reach thus is movable between the forwardly extended position illustrated in dash lines and the rearwardly retracted position adjacent the front wall of the container, as illustrated in solid lines. A removable locking pin 70 extends through registering openings in at least one of the arm portions and associated sleeve, in said extended and retracted positions, to secure the reach member in adjusted position.

In the retracted position the reach and coupling member are disposed closely adjacent the front wall of the container and out of the way of a person manipulating the assembly by hand. The connecting portion 64 of the reach member projects slightly forward, in the retracted position, to provide sufficient space for vertical adjustment of the caster wheel mounting shaft 54 (FIG. 1).

The laterally spaced fixed flanges 42 provide convenient means for converting the container from land trailering to trailering over snow or water. In FIG. 3 the container is shown mounted on a pair of laterally spaced snow runners 72. A pair of longitudinally spaced, upstanding coil springs 74 are secured at their bottom ends to each runner and at their upper ends to a mounting plate 76. Each plate is secured to one of the fixed flanges 42, as by means of the bolts 44 which extend through aligned openings in the plate and flange. In this arrangement the trailer hitch coupling member is adapted to be connected to the companion coupling member on a powered snow vehicle, as will be understood.

In FIG. 4 the lower ends of the coil springs 74 are secured to a pair of laterally spaced, hollow pontoons 78. In this instance the trailer hitch reach is coupled to a boat or amphibious vehicle, for trailering the container over water.

The combination trailer and hand cart described hereinbefore has many uses. As a yard implement it may be used to haul dirt, lawn and garden clippings, etc. In such use the rear wall 18 of the container first is secured in closed position, the reach member retracted and the caster wheel 50 extended for cooperation with the tires 34 in stabilizing the container for hand manipulation. When the container is filled, it is manipulated by hand to proper position to the rear of a vehicle, the trailer hitch reach is extended and the trailer hitch component 66 is coupled to the companion component on the towing vehicle. The caster wheel then is retracted upwardly where it is out of the way for trailering.

Upon arrival at the dumping site the rear wall is opened to the angle desired and the caster wheel is extended to stabilize the container. The trailer hitch couplings then are disconnected and the assembly is maneuvered by hand to the dumping area. The container then is tilted downward at the rear wall to allow the contents to slide from it.

The combination trailer and hand cart also may be employed to transport and utilize picnic and barbecue equipment. In FIG. 2 there is illustrated in dot and dash lines a barbecue unit 80 clamped or otherwise secured across the upper side of the side walls of the container, for transport to a picnic site. The rear wall 18 of the container may be retracted to the horizontal position illustrated in dash lines for use as a table top.

It will be understood that the caster wheel either is retained in the retracted position, or is completely removed from its mounting sleeve, when the snow runners of FIG. 3 or the water pontoons of FIG. 4 are employed.

From the foregoing it will be appreciated that the present invention provides a novel combination trailer and hand cart of simplified construction for economical manufacture, which is adjustable with speed and facility either for trailering or for hand manipulation, and which is convertible readily for movement over land, snow and water.

Having now described my invention and the manner in which it may be used, I claim:

1. A combination trailer and hand cart, comprising:
   (a) a container having bottom, front and side walls and a pivoted rear wall,
   (b) container support means extending downward from the container,
   (c) a U-shaped trailer hitch member defining laterally spaced, rearwardly extending arm portions and a forward, transverse connecting portion,
   (d) a trailer hitch coupling member on the connecting portion,
   (e) support means on the container supporting said arm portions for extension and retraction of the connecting portion relative to the container front wall,
   (f) locking means releasably interengaging the support means and at least one of the arm portions for securing the trailer hitch member in adjusted position, and
   (g) handle means on the container projecting forward of the front wall above the trailer hitch member.

2. The combination of claim 1 wherein the support means are secured to the outer sides of the container side walls.

3. The combination of claim 1 including:
   (a) a caster wheel having an elongated mounting shaft,
   (b) sleeve means on the container front wall centrally thereof receiving the caster wheel mounting shaft for vertical adjustment, and
   (c) securing means releasably interengaging the sleeve means and mounting shaft.

4. The combination of claim 1 wherein the container support means comprises a pair of laterally spaced wheels journaled for rotation on the container.

5. The combination of claim 1 wherein the container support means comprises a pair of laterally spaced snow runners mounted on the container.

6. The combination of claim 1 wherein the container support means comprises a pair of laterally spaced water pontoons mounted on the container.

7. The combination of claim 1 wherein the container support means comprises
   (a) a pair of laterally spaced flanges secured to the container,
   (b) a pair of container support members adapted for movement over a supporting surface, and
   (c) means detachably securing the support members one to each flange.

8. The combination of claim 7 wherein the support members comprise wheels, and the means detachably securing the support members to the flanges comprise wheel supporting hub assemblies.

9. The combination of claim 7 wherein the support members comprise snow runners, and the means detachably securing the support members to the flanges comprise spring means interconnecting the snow runners and flanges.

10. The combination of claim 7 wherein the support members comprise water pontoons, and the means detachably securing the support members to the flanges comprise spring means interconnecting the pontoons and flanges.

References Cited

UNITED STATES PATENTS

| | | | |
|---|---|---|---|
| 2,113,778 | 4/1938 | Willets | 280—491 |
| 2,896,969 | 7/1959 | Carty | 280—491 |

LEO FRIAGLIA, *Primary Examiner.*

ROBERT R. SONG, *Assistant Examiner.*

U.S. Cl. X.R.

280—14, 150.5, 475, 491; 296—57